United States Patent Office 3,435,078
Patented Mar. 25, 1969

3,435,078
α,ω-BIS(FLUOROPERHALOISOPROPOXY) - PERFLUOROALKANES AND PROCESS FOR PREPARING THEM
Henry R. Nychka, Dover, and Louis G. Anello, Basking Ridge, N.J., assignors to Allied Chemical Corporation, New York, N.Y., a corporation of New York
No Drawing. Filed May 16, 1967, Ser. No. 638,722
Int. Cl. C07c *41/00, 43/12*
U.S. Cl. 260—615                                    11 Claims

ABSTRACT OF THE DISCLOSURE

α,ω-Bis(fluoroperhaloisopropoxy)-perfluoroalkanes useful as thermally stable dielectric coolants, and to a process for preparing them by condensation with zinc in an inert solvent medium of two moles of a α-(fluoroperhaloisopropoxy)-omega-iodoperfluoroalkane.

This invention relates to new α,ω-bis(fluoroperhaloisopropoxy)-perfluoroalkanes of the formula

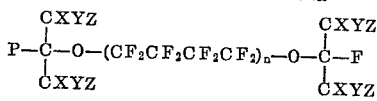

wherein X, Y and Z are the same or different members selected from the group consisting of fluorine and chlorine, at least two of which on each isopropoxy group are fluorines, $n$ is an integer from 1 to 5 inclusive, and to a process for preparing them.

The new compounds of our invention are fluoroperhalodiethers. They are chemically and thermally extremely stable, having high resistance to extreme temperatures and other environmental conditions.

Our new compounds are useful as inert reaction media for carrying out chemical reactions, as hydraulic fluids, as lubricants and as heat transfer agents. They are especially useful as dielectric liquid and/or vapor phase coolants and heat transfer media for use in electrical and electronic equipment, and as chemically and thermally stable fluids, useful in withstanding environmental conditions of extremes of both high and low temperatures.

Recent developments in the electrical industry have tended to require operation of electrical equipment under conditions which provide only limited space for cooling, and in addition require coolants which have high thermal conductivities, coupled with high dielectric strengths, high volume resistivities, low dissipation factors and extreme chemical and thermal stabilities over a wide range of temperatures and other environmental conditions. Such compounds must also have a wide liquid range, be nonflammable, nonexplosive and nontoxic.

The above requirements have been at least partially met in the past by the development and use of certain fluorocarbons which have provided operational systems of lighter weight and occupying substantially less space than prior art coolants. While such fluorocarbon coolants have proved of great value, their wide application has been limited by their extremely high cost, and by the tendency to ever greater miniaturization of equipment and higher efficiency requirements.

Thus, with the development of the space age, further improvements are constantly being sought, and the need for new methods and materials for removing the heat from electronic packages and maintaining temperatures of heat sensitive components within precise ranges is increasing. For these purposes, fluids in which the electrical components can be immersed are highly desirable, and such fluids must meet the extreme temperatures and environmental conditions that are experienced in advanced aerospace systems and thus must have exacting electrical, physical and thermal properties.

The excessive cost of fluorocarbons which have been used in the past for this type of electrical insulating and heat transfer has been due to their expensive method of preparation involving electrolyzing a hydrocarbon or hydrocarbon ether in a medium of liquid hydrogen fluoride. This procedure is not only expensive and hazardous per se but provides low yields of fluorinated products, such products being generally contaminated with, for example, unreacted or incompletely reacted hydrocarbon to an extent requiring further purification of the product.

Our new perfluorodiethers, on the other hand, not only meet all the above requirements, but also can be made by a series of simple chemical reactions not requiring the use of electrolysis or of HF and which produce high yields (ca. 80%) of extremely pure product.

The new compounds of our invention can be prepared by the condensation of two moles of a 1-(fluoroheptahaloisopropoxy)-ω-iodoperfluoroalkane as defined hereinafter, by reaction with zinc in nonreactive solvent media, most favorably in methylene chloride-acetic anhydride medium, with elimination of iodine as ZnI₂. Starting with a hexahaloacetone, the iodo compound, which is the starting material in our process, can be prepared by a series of two known reactions wherein hexahaloacetone is reacted with potassium fluoride, and the resuling KF adduct is reacted with tetrafluoroethylene and iodine to produce 1-(heptahaloisopropoxy) - 2 - iodotetrafluoroethane. Two moles of this iodo compound are then condensed by the procedure of our invention to form the first member of our series of new diethers. For preparation of the longer chain compounds, i.e. wherein $n$ is greater than 1, the 1-(heptahaloisopropoxy) - 2 - iodotetrafluoroethane is reacted with additional tetrafluoroethylene in the presence of a catalyst such as t-butyl peroxide whereby the chain may be lengthened by increments of 2 carbon atoms, forming a 1-(fluoroperhaloisopropoxy)-omega-iodo-perfluoroalkane of the desired even number of alkane carbons, for use in the final condensation reaction. Illustrative equations are shown below:

EQUATION 1.—PREPARATION OF HALOACETONE-KF ADDUCT

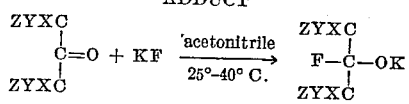

EQUATION 2.—PREPARATION OF 1-(FLUOROPERHALOISOPROPOXY)-2-IODOTETRAFLUOROETHANE

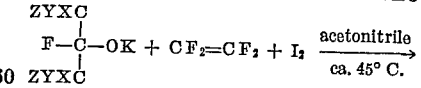

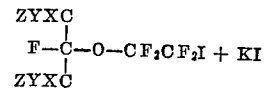

EQUATION 3.—TELOMERIZATION

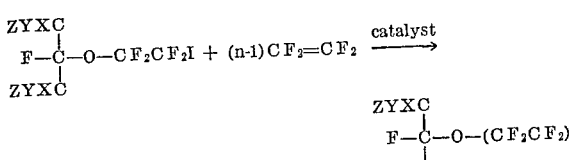

EQUATION 4.—CONDENSATION

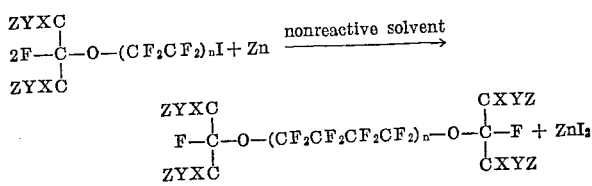

In carrying out the condensation reaction (Equation 4), a reaction medium is prepared containing the nonreactive solvent. To this is added an amount of metallic zinc at least theoretically sufficient to react with the iodine in the fluorocarbon iodine, preferably a slight excess. The 1-(heptahaloisopropoxy)-iodoperfluoroalkane is then charged to the zinc-containing reaction medium, for example under agitation. The reaction initiates spontaneously and is slightly exothermic. The reaction mixture is gently refluxed and reaction is usually complete in a period of about 6 to 24 hours. Longer times of reflux may be used, but appear to yield little, if any additional product.

As nonreactive solvent there can be used any suitable nonreactive liquid boiling between about 40° C. and about 100° C., including the lower aliphatic alcohols of 1 to 4 carbon atoms, i.e. methanol, ethanol, the propanols and the butanols, as well as 1,4-dioxane. For best yields, however, we prefer to use a particular mixture of methylene chloride and acetic anhydride, containing a major proportion of methylene chloride ($CH_2Cl_2$) and a minor but appreciable proportion of acetic anhydride, preferably at least a third the amount by weight of methylene chloride, for example, between about 0.3 part and about 1 part of acetic anhydride per 1 part of methylene chloride by weight. Such a solvent system has been found to provide unusually high yields of the diethers, for example, between about 60% and about 80% or higher, whereas the alcohols and 1,4-dioxane produce considerably lower yields of diether product mixed with appreciable quantities of monoethers.

A solvent reaction medium comprising a mixture of methylene chloride ($CH_2Cl_2$) and acetic anhydride, preferably in the proportion of at least about 0.3 part by weight of acetic anhydride per 1 part of methylene chloride appears to be essential for high yields of diether and suppression of formation of the monoethers. When methylene chloride is used alone as the reaction solvent, yields of diether are sharply reduced and amount to only about 10% of theoretical. Substitution of ethyl acetate or acetone for the methylene chloride-acetic anhydride system is unsatisfactory and fails to promote significant coupling.

The quantity of methylene chloride-acetic anhydride reaction medium required to promote the coupling reaction is not unduly critical so long as enough of the mixture is present to provide a liquid medium in which all of the iodo compound and reaction products are disposed. Usually an amount of solvent mixture at least about equal to two parts by weight for each part by weight of 1-(heptahaloisopropoxy)-omega-iodo-perfluoroalkane is sufficient, preferably between about 2 parts and about 5 parts.

The following specific examples further illustrate our invention. Parts are by weight except as otherwise noted.

EXAMPLE 1

Into a 500 ml. flask was placed 653 g. (1.58 moles) of $(CF_3)_2CFOCF_2CF_2I$ (B.P. 86° C.). Twelve grams (0.18 mole) of zinc dust was added. Then about 45 ml. of absolute methanol were slowly added to the stirred mixture at 25° C. The reaction was quite exothermic and the temperature rose rapidly to 53° C. The addition was stopped and then continued when temperature dropped to 40% C. This temperature was maintained overnight. The mixture was washed with water, dried and filtered. The 598 g. of crude oil was distilled. There was recovered: 15 g. (0.052 mole) of $(CF_3)_2CFOCF_2CF_2H$, B.P. 46° C.; 449 g. (1.09 mole) of $(CF_3)_2CFOCF_2CF_2I$, B.P. 86° C.; and 20 g. (0.035 mole) of $[(CF_3)_2CFOCF_2CF_2]_2$, B.P. 128 to 132° C. equivalent to an 19.5% yield of $$[(CF_3)_2CFOCF_2CF_2]_2$$

based on zinc added.

EXAMPLE 2

Into a 500 ml. flask was placed 357 g. (0.87 mole of $(CF_3)_2CFOCF_2CF_2I$. Eight grams (0.12 mole) of zinc dust was added. About 28 g. of absolute methanol was slowly added while maintaining the reaction temperature at 20° C. The mixture was stirred for four hours at this temperature. The mixture was washed, dried and filtered. The 339 g. of crude oil was distilled. There was recovered: 17 g. (0.060 mole) of $(CF_3)_2CFOCF_2CF_2H$, B.P. 46° C.; 295 g. (0.71 mole) of $(CF_3)_2CFOCF_2CF_2I$, B.P. 86° C.; and 1.35 g. (0.24 mole) of $$[(CF_3)_2CFOCF_2CF_2]_2$$

B.P. 132–134° C. equivalent to a 20% yield of $$[(CF_3)_2CFOCF_2CF_2]_2$$

based on zinc added.

*Analysis.*—Calcd. for $[(CF_3)_2CFOCF_2CF_2]_2$: C, 21.05; F, 73.33. Found: C, 20.93; F, 72.69. The analyses above indicate the product is the diether.

EXAMPLE 3

Into a 200 ml. flask was placed 100 ml. 1,4-dioxane and 65 g. (1.0 mole) of zinc dust. This zinc slurry was heated to 100° C. and 88 g. (0.21 mole) of $$(CF_3)_2CFOCF_2CF_2I$$

was slowly added over a three hour period. The reflux temperature dropped to 72° C. The mixture was further heated at this temperature for three additional hours. The mixture was washed, dried, filtered and distilled. There was recovered: 23.5 g. (0.081 mole) of $$(CF_3)_2CFOCF_2CF_2H$$

14 g. (0.034 mole) of $(CF_3)_2CFOCF_2CF_2I$; and 10 g. (0.0175 mole) of $[(CF_3)_2CFOCF_2CF_2]_2$ equivalent to an 18% yield of 1,4-bis(heptafluoroisopropoxy)-octafluorobutane based on the 1-(heptafluoroisopropoxy)-2-iodotetrafluoroethane.

EXAMPLE 4

Into a reaction flask were placed 60 g. of acetic anhydride, 125 ml. (167 g.) of methylene chloride and 20 g. (0.31 mole) of zinc. The resulting slurry was stirred and into the stirred slurry was charged 103.6 g. (0.25 mole) of 1-heptafluoroisopropoxy)-2-iodoethane (B.P. 86° C.). The mixture became mildly exothermic causing its temperature to raise from 22° C. to 43° C. over a two hour period. Thereafter the mixture was gently refluxed (43° C.) for 20 hours. The reaction mixture was then cooled and 100 ml. of 5% sulfuric acid was added, whereupon three liquid layers formed. The bottom layer, containing the product, was washed twice with water, dried over $Na_2SO_4$ and distilled through a spinning band column. The product fraction was 39 g. of a water white liquid of boiling point 133°–134° C. It was 99.5% pure according to a vapor phase chromatographic analysis. The percent yield was 63%, based on the 1-(heptafluoroisopropoxy)-2-iodoethane, after adjusting for a small amount of intermediate cut and column holdup. A fluorine nuclear magnetic resonance analysis (performed on a Varian DP–56 NMR Spectrometer using $CFCl_3$ as standard) of the resulting product confirmed the composition as being 1,4-bis(heptafluoroisopropoxy)-octafluorobutane, and supports the structure of

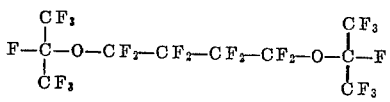

as shown by the NMR results tabulated below:

| Types of fluorine | Chemical shift (p.p.m.) | Fluorine area ratio | |
|---|---|---|---|
| | | Theory | Found |
| 4×$CF_3$ | } 82.0 | 16 | 16 |
| 2×$CF_2O$ | | | |
| 2×$CF_2$ | 127.1 | 4 | 4 |
| 2×CF | 146.2 | 2 | 1.9 |

A mass spectrographic analysis showed the characteristic ionic fragments for the products including the fragment of the parent compound minus fluorine at mass number 551. The infrared analysis was consistent for a perfluoroether, and exhibited characteristic absorption peaks at 7.25 microns, 8.00 microns, 8.22 microns, 8.65 microns, 10.08 microns and 11.18 microns.

*Elemental analysis.*—Calculated for $C_{10}F_{22}O_2$ showed. Theory: C, 21.1; F, 73.7. Found: C, 20.8; F, 70.7. Molecular weight. Theory: 570. Found: 585 (NMR).

EXAMPLE 5

The same quantities of reactants and reaction medium as recited in Example 4 were combined and stirred. In one hour the temperature increased from 26° C. to a reflux temperature of 46° C. Thereafter the reaction mixture was refluxed for 24 hours more. A Dean-Stark layering trap was then attached to the reaction vessel which permitted layering without the addition of $H_2SO_4$ and the reflux continued. In about 2 hours 64.2 g. of crude product was collected as a lower phase in the trap. Distillation of crude product through a spinning band column gave 6.3 g. of forerun (B.P. 28–30° C.) and 57.9 g. of product (B.P. 134° C.). The product yield was 81%. Infrared analysis of product was identical with that of Example 1.

EXAMPLE 6

The same quantities of reactants and reaction medium as cited in Example 4 were combined and stirred. The reaction mixture was then brought to a reflux immediately. In 6 hours the coupling reaction was judged complete based on the results of an infrared analysis of the reaction mixture. The latter no longer showed the presence of the starting iodo ether. The product, isolated as in Example 5, was obtained in 80% yield. After removal of product, filtration of methylene chloride acetic anhydride reaction medium gave 50.6 g. of solid of which 8 g. was unreacted zinc and the remainder zinc iodide.

EXAMPLE 7

The 1,4-bis(heptafluoroisopropoxy)-octafluorobutane prepared in Example 4 was tested to determine various physical and electrical properties in comparison with two perfluorocarbon ethers (B and C) available commercially and recommended for use as dielectric vapor coolants, with results shown in Table I below:

TABLE I.—COMPARISON OF PHYSICAL AND ELECTRICAL PROPERTIES OF 1,4-BIS(HEPTAFLUOROISOPROPOXY)-OCTAFLUOROBUTANE (A) WITH THOSE OF TWO COMMERCIAL FLUOROCARBON ETHERS, B AND C

| Property | A | B | C |
|---|---|---|---|
| Boiling point, °C | 135 | 99–107 | 152 |
| Freezing point, °C | −85 | −113 | [1] −115 |
| Density, g./cc. at 25° C | 1.75 | 1.76 | 1.72 |
| Viscosity centiposies at— | | | |
| 25° C | 1.2 | 0.82 | 1.2 |
| 54° C | 27.0 | 7.40 | 21.6 |
| Thermal conductivity, 25° C. B.t.u./hr. ft.² F/ft. | 0.092 | 0.091 | 0.041 |
| Dielectric strength, kv./0.1″ ASTM-D-877 | 35 | 31 | 29 |
| Dielectric constant, 1 kc. ASTM-D-150 | 1.86 | 1.89 | 2.57 |
| Dissipation factor, 1 kc. ASTM-D-150 | <.0005 | <.0005 | <.0005 |
| Volume Resistivity, ohm-cm. ASTM-D-257 | 8.1×10¹¹ | 7.6×10¹⁵ | 1.4×10¹³ |

[1] Pour point.

NOTE.—A is 1,4-bis(heptafluoroisopropoxy)-octafluroobutane of this invention; B is a six membered cyclic fluorocarbon ether having a three carbon side chain and formula $C_8F_{16}O$ commercially available as FC-75; C is believed to be $C_3F_7O(CFCF_3CF_2O)_2CFHCF_3$ commercially available as Freon E-3.

It will be noted from the figures in the table that the 1,4-bis(heptafluoroisopropoxy) - octafluorobutane of our invention is substantially equal to or superior to the two commercial fluoroethers in all of the critical properties listed in the table. Our new fluorocarbon diether is superior to the commercial products in dielectric strength with a value of 35 kv./0.1″ as against 31 and 29 respectively in the two commercial materials, and has a desirably higher thermal conductivity than either of the two commercial compounds.

A thermal stability test of our 1,4-bis(heptafluoroisopropoxy)-octafluorobutane and the two commercial ethers, E–3 and FC–75, was performed by storing the three ether samples in sealed Pyrex glass tubes at 400° C. for seven days.

After the first day the E–3 sample showed signs of decomposition. It had become turbid and had severely etched the glass tube. After seven days the FC–75 sample had coated the Pyrex tube with a heavy opaque carbon deposit and had become strongly acidic. In contrast, the diether sample of our invention was still clear and water white after the seven day test. There was also no sign of attack on the Pyrex tube. Comparison of vapor phase chromatographic analyses of our diether before and after the heat test showed virtually no change, thus indicating that our new diether is significantly more heat resistant than the prior art compounds tested.

EXAMPLE 8

Preparation of 1,4-bis(1-chlorohexafluoroisopropoxy)-octafluorobutane

A stirred suspension of 214 g. (0.50 mole) of 1-(1-chlorohexafluoroisopropoxy) - 2 - iodo-tetrafluoroethane, $CF_3(CF_2Cl)CFOCF_2CF_2I$ (B.P. 115° C.), 40 g. (0.60 mole) of zinc dust, 120 g. of acetic anhydride and 250 ml. (325 g.) of methylene chloride was refluxed at 47° C. gently for 20 hours. The reaction mixture was then filtered from the excess zinc and zinc iodide, yielding a filtrate containing two layers. The lower layer was crude product and amounted to 110.8 g. The crude product was fractionated and yielded 12.3 g. of forerun and 87.2 g., B.P. 172–172.5° C. of 99% pure 1,4-bis(1-chlorohexafluoroisopropoxy)-octafluorobutane of the formula

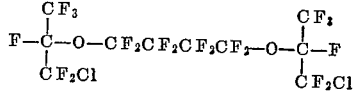

The yield of above product was 58% of theory. Fluorine NMR data and elemental analysis support the above assigned structure and are listed in Table II below.

EXAMPLE 9

Preparation of 1,4-bis(1,3-dichloropentafluoroisopropoxy)-octafluorobutane

In a manner similar to that described in Example 8 above, 1-(1,3-dichloropentafluoroisopropoxy) - 2 - iodotetrafluoroethane $(CF_2Cl)_2CFOCF_2CF_2I$ (B.P. 148° C.), was refluxed with zinc dust in a medium acetic anhydride-methylene chloride mixture, and the resulting crude product was separated and fractionated. A 47% yield of 99% purity 1,4-bis(1,3-dichloropentafluoroisopropoxy)-octafluorobutane of the formula

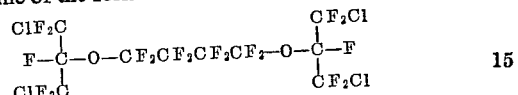

was recovered, having the physical properties and NMR data shown in Table II below.

EXAMPLE 10

Preparation of 1,4-bis(1,1,3-trichlorotetrafluoroisopropoxy)-octafluorobutane

In a manner similar to that described in Example 8 above, 1 - (1,1,3-trichlorotetrafluoroisopropoxy)-2-iodotetrafluoroethane, $(CF_2Cl)(CFCl_2)CFOCF_2CF_2I$ (B.P. 78° C./25 mm.), was refluxed with zinc dust in a methylene chloride acetic anhydride medium, and the resulting crude product was separated and fractionated. There resulted a 57% yield of 99% purity 1,4 - bis(1,1,3-trichlorotetrafluoroisopropoxy) - octafluorobutane of the formula

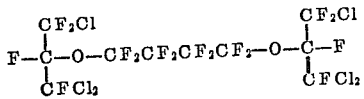

It had the physical properties and NMR data shown in Table II below.

TABLE II.—PHYSICAL PROPERTIES OF PRODUCTS OF EXAMPLES 8, 9 AND 10

| Example No. | 8 | 9 | 10 |
|---|---|---|---|
| Boiling point, °C | 172 | 218 | (¹) |
| Percent yield | 58 | 47 | 57 |
| Percent chlorine: | | | |
| Found | 11.8 | 22.2 | 31.6 |
| Theory | 11.7 | 22.3 | 31.8 |
| Fluorine NMR chemical shifts (δ p.p.m.):² | | | |
| CF₃ | 80.2 | | |
| CF₂Cl | 70.0 | 67.1 | 61.2 |
| CFCl₂ | | | 69.0 |
| OCF₂ | 82.2 | 80.5 | 80.5 |
| CF₂ | 127 | 126.8 | 126.3 |
| CF | 142 | 137 | 131.6 |

¹ 125/7 mm.
² Obtained with Varian DP-56 NMR spectrometer using CFCl₃ as solvent and internal standard.

INFRARED ABSORPTION PEAKS, MICRONS

| Example No. | | |
|---|---|---|
| 8 | 9 | 10 |
| 7.75 | 8.29 | 7.70 |
| 8.15 | 8.51 | 8.01 |
| 8.68 | 8.66 | 8.25 |
| 9.63 | 10.25 | 8.68 |
| 10.75 | 11.94 | 10.24 |
| | | 11.00 |

EXAMPLE 11

A stirred suspension of 51.2 g. (.1 mole) of 1-(heptafluoroisopropoxy)-4-iodooctafluorobuane, $$(CF_3)_2CFO(CF_2CF_2)_2I$$

(B.P. 72° C./100 mm.), 8.0 g. (0.12 mole) of zinc dust, 27 g. of acetic anhydride and 78 g. of methylene chloride was refluxed for 24 hours. The reaction mass was then filtered to remove zinc iodide and excess zinc and yielded a filtrate composed of two layers. The lower product layer amounted to 28.7 g. of crude product. Upon fractionation of the crude 22.7 g., a 57% yield of 1,8 - bis(heptafluoroisopropoxy) - perfluorooctane was obained of the boiling point 199° C., freezing point —28° C. Purity was 99%, as measured by vapor phase chromatographic analysis. Its infrared spectrogram exhibited characteristic strong absorption peaks at 8.00 microns, 8.18 microns, 8.56 microns, 8.64 microns and 10.09 microns. Its boiling point, infrared spectrum, and fluorine Nuclear Magnetic Resonance (NMR) analysis, the latter listed in Table III below, corroborated the structure shown in the formula below:

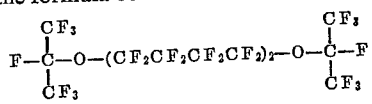

EXAMPLE 12

A stirred suspension of 61.2 g. (0.1 mole) of 1-(heptafluoroisopropoxy)-6-iodododecafluorohexane, $$(CF_3)_2CFO(CF_2CF_2)_3I$$

(B.P. 74° C./25 mm.), 8.0 g. (0.12 mole) of zinc dust, 27 g. acetic anhydride and 130 g. of methylene chloride was refluxed (ca. 50° C.) for 21 hours. The resulting solid product was filtered from the cooled reaction mixture along with zinc iodide and excess zinc. The filtered mass was warmed to 50° C. whereupon the product melted and was separated by decantation from the zinc and zinc iodide. There were thus recovered 31 g. of a white waxy solid equivalent to a 65% yield of 1,12-bis(heptafluoroisopropoxy) - perfluorododecane of boiling point 254° C., melting point 40° C. Its infrared spectrogram exhibited strong characteristic absorption peaks at 8.00 microns, 8.16 microns, 8.65 microns and 10.10 microns. Its boiling point, infrared spectrum and fluorine NMR analysis, the latter listed in Table III below, corroborated the structure shown below:

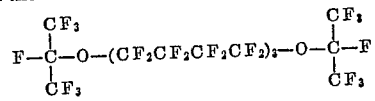

EXAMPLE 13

A stirred susension of 48 g. (0.067 mole) of 1-(heptafluoroisopropoxy)-8-iodohexadecafluorooctane, $$(CF_3)_2CFO(CF_2CF_2)_4I$$

(B.P. 102° C./25mm.), 5.2 g. (0.08 mole) of zinc dust, 27 g. acetic anhydride and 130 g. of methylene chloride was refluxed for 17 hours. The resulting solid product was filtered from the cooled reaction mixture together with zinc iodide and excess zinc. The filtered material was extracted with a commercial perfluorocyclic ether (FC-75) boiling point 102° C. to separate product from zinc and zinc iodide. Evaporation of the extract gave 23 g. of a white waxy product representing a 61% yield of 1,16 - bis(heptafluoroisopropoxy) - perfluorohexadecane of boiling point 295° C., melting point 91°-92° C. Its infrared spectrogram exhibited characteristic strong absorption peaks at 7.32 microns, 7.60 microns, 8.02 microns, 8.28 microns, 8.69 microns, 8.88 microns, 10.07 microns, 13.46 microns and 13.75 microns.

Its boiling point, infrared spectrum and fluorine NMR analysis, the latter listed in Table III below, corroborated its structure shown by the formula below:

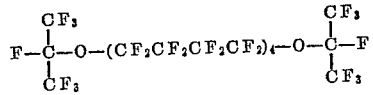

EXAMPLE 14

A stirred suspension of 40 g. (0.05 mol) of 1-(heptafluoroisopropoxy)-10-iodo-eicosafluorodecane, $$(CF_3)_2CFO(CF_2CF_2)_5I$$

5.2 g. (0.08 mole) of zinc dust, 27 g. acetic anhydride and 130 g. of methylene chloride was refluxed (ca. 50° C.) for 24 hours. The resulting white waxy solid product was recovered as described in Example 13 above and gave 20.5 g., or a 60% yield of 1,20-bis(heptafluoroisopropoxy)-perfluoroeicosane. Its boiling point was 329° C., melting point 125–126° C. Its infrared spectrogram exhibited strong characteristic absorption peaks at 7.32 microns, 7.55 microns, 8.00 microns, 8.25 microns, 8.69 microns, 8.88 microns, 10.09 microns and 13.76 microns. Its boiling point, infrared spectrum and fluorine NMR analysis, the latter listed in Table III below, corroborated the structure shown in the formula below:

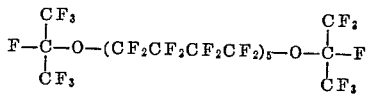

Yields in all examples except Examples 1 and 2 are expressed as percent of theory, based on the amount of α-(fluoroperhaloisopropxy)-ω-iodoperfluoroalkane used as starting material.

The thermal stability and electrical characteristics of the compounds of Examples 8–14 are of the same general order of magnitude as that of 1,4-bis(heptafluoroisopropoxy)-octafluorobutane set forth in Example 7.

In Table III below are listed the nuclear magnetic resonance analyses of the compounds of Examples 11–14 inclusive in terms of fluorine NMR chemical shifts (delta p.p.m.).

TABLE III.—FLUORINE NMR CHEMICAL SHIFTS ($\delta$ P.P.M.)*

| Example No. | $CF_3$ | $OCF_2$ | $(CF_2)_x$ | [x] | $OCF_2CF_2$ | CF |
|---|---|---|---|---|---|---|
| 11 | 81.3 | 80.7 | 122 | 54. | 125 | 145 |
| 12 | 81.8 | 81.2 | 122 | 58. | 126 | 146 |
| 13 | 82.5 | 81.9 | 123 | 512. | 126 | 146 |
| 14 | 82.5 | 81.9 | 122 | 516. | 126 | 143 |

*Obtained with Varian DP-56 NMR Spectrometer using $CFCl_3$ as solvent and internal standard for Examples 11 and 12. $C_6F_6$ was used as solvent and secondary internal standard and values converted to external $CFCl_3$ scale for Examples 13 and 14.

We claim:
1. As new compounds, the α,ω-bis-(fluoroperhaloisopropoxy)perfluoroalkanes of the formula:

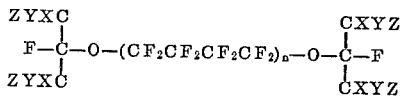

wherein X, Y and Z are the same or different members of the group consisting of chlorine and fluorine, at least two of said members on each isopropoxy group being fluorine, and $n$ is an integer from 1 to 5 inclusive.

2. The compounds of claim 1 wherein all X, Y and Z members are fluorine.
3. The compounds of claim 1 wherein five of the X, and Z members on each isopropoxy group are fluorine, the remaining member is chlorine.
4. The compounds of claim 1 wherein four of the X, Y and Z members on each isopropoxy group are fluorine, two are chlorine.
5. The compounds of claim 1 wherein three of the X, Y and Z members on each isopropoxy group are fluorine, three are chlorine.
6. The compounds of claim 1 wherein $n$ is 1.
7. The compounds of claim 1 wherein $n$ is 2.
8. The compounds of claim 1 wherein $n$ is 3.
9. The compounds of claim 1 wherein $n$ is 4.
10. The compounds of claim 1 wherein $n$ is 5.
11. The compounds of claim 6 wherein all the X, Y and Z members are fluorine.

References Cited

UNITED STATES PATENTS

| 2,035,386 | 3/1936 | Salzberg | 260—615 |
| 2,500,388 | 3/1950 | Simons. | |
| 2,824,141 | 2/1958 | Zisman. | |
| 3,214,478 | 10/1965 | Milian. | |

OTHER REFERENCES

Henne, Jour. Amer. Chem. Soc., vol. 75 (1953), p. 5750.

Henne et al.: Jour. Amer. Chem. Soc., vol. 77 (1955), 252—54, 65, 77

LEON ZITVER, Primary Examiner.

HOWARD T. MARS, Assistant Examiner.

U.S. Cl. X.R.

252—54, 65, 77